(12) United States Patent
Saxena et al.

(10) Patent No.: US 11,150,925 B2
(45) Date of Patent: Oct. 19, 2021

(54) METHOD AND SYSTEM FOR COMPOUND APPLICATION VIRTUALIZATION

(71) Applicant: DATA ACCELERATOR LIMITED, London (GB)

(72) Inventors: Priya Saxena, London (GB); Jyothirmai Uppuluri, London (GB)

(73) Assignee: DATA ACCELERATOR LTD., London (GB)

( * ) Notice: Subject to any disclaimer, the term of this patent is extended or adjusted under 35 U.S.C. 154(b) by 598 days.

(21) Appl. No.: 15/392,965

(22) Filed: Dec. 28, 2016

(65) Prior Publication Data

US 2018/0011723 A1 Jan. 11, 2018

Related U.S. Application Data

(60) Provisional application No. 62/359,507, filed on Jul. 7, 2016.

(51) Int. Cl.
*G06F 9/455* (2018.01)
*G06F 9/54* (2006.01)
*G06F 9/448* (2018.01)

(52) U.S. Cl.
CPC ............ *G06F 9/455* (2013.01); *G06F 9/4484* (2018.02); *G06F 9/545* (2013.01)

(58) Field of Classification Search
None
See application file for complete search history.

(56) References Cited

U.S. PATENT DOCUMENTS

| | | | |
|---|---|---|---|
| 7,162,710 B1 * | 1/2007 | Edwards ................... | G06F 8/65 717/111 |
| 8,539,515 B1 | 9/2013 | Protassov et al. | |
| 2005/0108562 A1 * | 5/2005 | Khazan ................ | G06F 11/3604 726/23 |
| 2008/0172677 A1 * | 7/2008 | Tripathi ................ | G06F 9/4843 719/315 |
| 2012/0088584 A1 | 4/2012 | Mamtani et al. | |
| 2013/0347009 A1 | 12/2013 | Hall | |
| 2014/0373009 A1 * | 12/2014 | Jacobson ................ | G06F 9/455 718/1 |
| 2016/0088109 A1 | 3/2016 | Chen et al. | |
| 2017/0060605 A1 | 3/2017 | Huang et al. | |
| 2017/0147316 A1 | 5/2017 | Reierson et al. | |
| 2017/0155724 A1 * | 6/2017 | Haddad ................... | H04L 67/16 |
| 2017/0243001 A1 | 8/2017 | Jawa et al. | |

OTHER PUBLICATIONS

Singer, Jeremy et al.; "Supporting Higher-Order Virtualization"; 15 pgs.; Jan. 2006.

Vokorokos, Liberios et al.; "Application Security through Sandbox Virtualization"; Acta Polytechnica Hungarica, vol. 12, No. 2; 19 pgs; 2015.

* cited by examiner

*Primary Examiner* — Chat C Do
*Assistant Examiner* — William C Wood

(57) ABSTRACT

A method for running an application via an operating system executing on a computing device is disclosed. In an embodiment, the method involves subjecting an API call to a complimentary application virtualization layer, after the API call is subjected to the complimentary application virtualization layer, subjecting the API call to a primary application virtualization layer, and after the API call has been subjected to the complimentary application virtualization layer and to the primary application virtualization layer, forwarding the API call to the operating system for processing in the kernel-space.

8 Claims, 14 Drawing Sheets

COMPONENTS OF AN APP-V 5.x PACKAGE

| FILE TYPE/NAME | DESCRIPTION |
|---|---|
| .appv | THE .appv FILE IS THE COMPRESSED PACKAGE FILE THAT CONTAINS ALL OF THE OTHER PARTS OF THE PACKAGE. |
| [Content_Types].xml | THE FILE CONTAINS A LIST OF FILE EXTENSIONS THAT THE PACKAGE SUPPORTS AND THE TYPE OF CONTENT TO WHICH EACH EXTENSION TYPE MAPS. |
| AppxBlockMap.xml | THIS FILE CONTAINS A LIST OF FILES WITH DETAILS SUCH AS HEADER SIZE AND FILE SIZE. |
| AppxManifest.xml | THIS FILE CONTAINS METADATA ABOUT THE PACKAGE. |
| FilesystemMetadata.xml | THIS FILE CONTAINS INFORMATION SUCH AS SHORT FILE NAMES, THE DIRECTORY-FILE HIERARCHY, AND THE MAPPING BETWEEN THE ROOT FOLDER AND INSTALLDIR. |
| Registry.dat | THIS FILE CONTAINS REGISTRY DATA FOR THE PACKAGE. |
| StreamMap.xml | THIS FILE CONTAINS FEATURE BLOCK 1 INFORMATION. |

METHOD AND SYSTEM FOR COMPOUND APPLICATION VIRTUALIZATION

CROSS-REFERENCE TO RELATED CASE

This application is entitled to the benefit of provisional U.S. Patent Application Ser. No. 62/359,507, filed Jul. 7, 2016, which is incorporated by reference herein.

FIELD OF THE INVENTION

The invention relates generally to application virtualization.

BACKGROUND

In traditional enterprise environments, desktop software applications, such as productivity tools and database management tools, have been installed on local machines and run natively on the local machines. In client-server environments, software clients can run client-server based applications in which a database is stored on a server. More recently, traditional desktop applications have been "virtualized" such that "virtualized applications" can be run at a local machine with less dependency on the specific configuration (e.g., operating system version) of the local machine. Application virtualization is a technique in which an application is decoupled from the underlying operating system of the local machine on which the application executes. Various techniques for application virtualization are known in the field. Although application virtualization enables applications to run on local machines with different operating system configurations, different techniques for application virtualization offer different benefits.

SUMMARY

A method for running an application via an operating system executing on a computing device is disclosed. In an embodiment, the method involves subjecting an API call to a complimentary application virtualization layer, after the API call is subjected to the complimentary application virtualization layer, subjecting the API call to a primary application virtualization layer, and after the API call has been subjected to the complimentary application virtualization layer and to the primary application virtualization layer, forwarding the API call to the operating system for processing in the kernel-space.

In an embodiment, subjecting an API call to a complimentary application virtualization layer involves parsing the opcode of the API call and over-writing a jump instruction in a parsed portion of the opcode.

In a further embodiment, subjecting an API call to a complimentary application virtualization layer involves scanning for the length of initial opcodes and removing the initial bytes of an opcode sufficient to insert a desired jump instruction to the function with the redirection to the sandbox of the complimentary virtualization layer.

In a further embodiment, subjecting an API call to a complimentary virtualization layer involves following the jump destination and replacing the jump destination to point to the function with the redirection to the sandbox of the complimentary virtualization layer.

In another embodiment, a method for running an application via an operating system executing on a computing device is disclosed. In an embodiment, the method involves virtualizing an API call from the application at to a complimentary application virtualization layer to generate a virtualized API call, virtualizing the virtualized API call at a primary application virtualization layer to generate a compound virtualized API call, and forwarding the compound virtualized API call to the operating system for processing in the kernel-space.

In another embodiment, a method for running an application via an operating system executing on a computing device is disclosed. In an embodiment, the method involves intercepting an API call at a complimentary application virtualization layer to generate a virtualized API call, virtualizing the virtualized API call according to a primary application virtualization layer to generate a compound virtualized API call, and forwarding the compound virtualized API call to the operating system for processing in the kernel-space.

A system for running an application via an operating system executing on a computing device is disclosed. In an embodiment, the system includes at least one processing unit and memory, an operating system stored on the memory, a complimentary application virtualization layer stored on the memory, and a primary application virtualization layer stored on the memory, wherein execution of an application on the operating system involves subjecting an API call from the application to the complimentary application virtualization layer, after the API call is subjected to the complimentary application virtualization layer, subjecting the API call to a primary application virtualization layer, and after the API call has been subjected to the complimentary application virtualization layer and to the primary application virtualization layer, forwarding the API call to the operating system for processing in the kernel-space.

A non-transitory computer readable medium that stores computer-executable code is disclosed. The computer-executable code includes a compound virtualization package, the compound virtualization package including, and an application incorporated into a primary virtualization package and the primary virtualization package incorporated into a complimentary virtualization package, wherein the complimentary virtualization package and the primary virtualization package include layer-specific virtualization logic files, virtual files stores, and virtual configurations.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 3 depicts a table that includes components of an App-V version 5.x application package.

Throughout the description, similar reference numbers may be used to identify similar elements. Additionally, in some cases, reference numbers are not repeated in each figure in order to preserve the clarity and avoid cluttering of the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
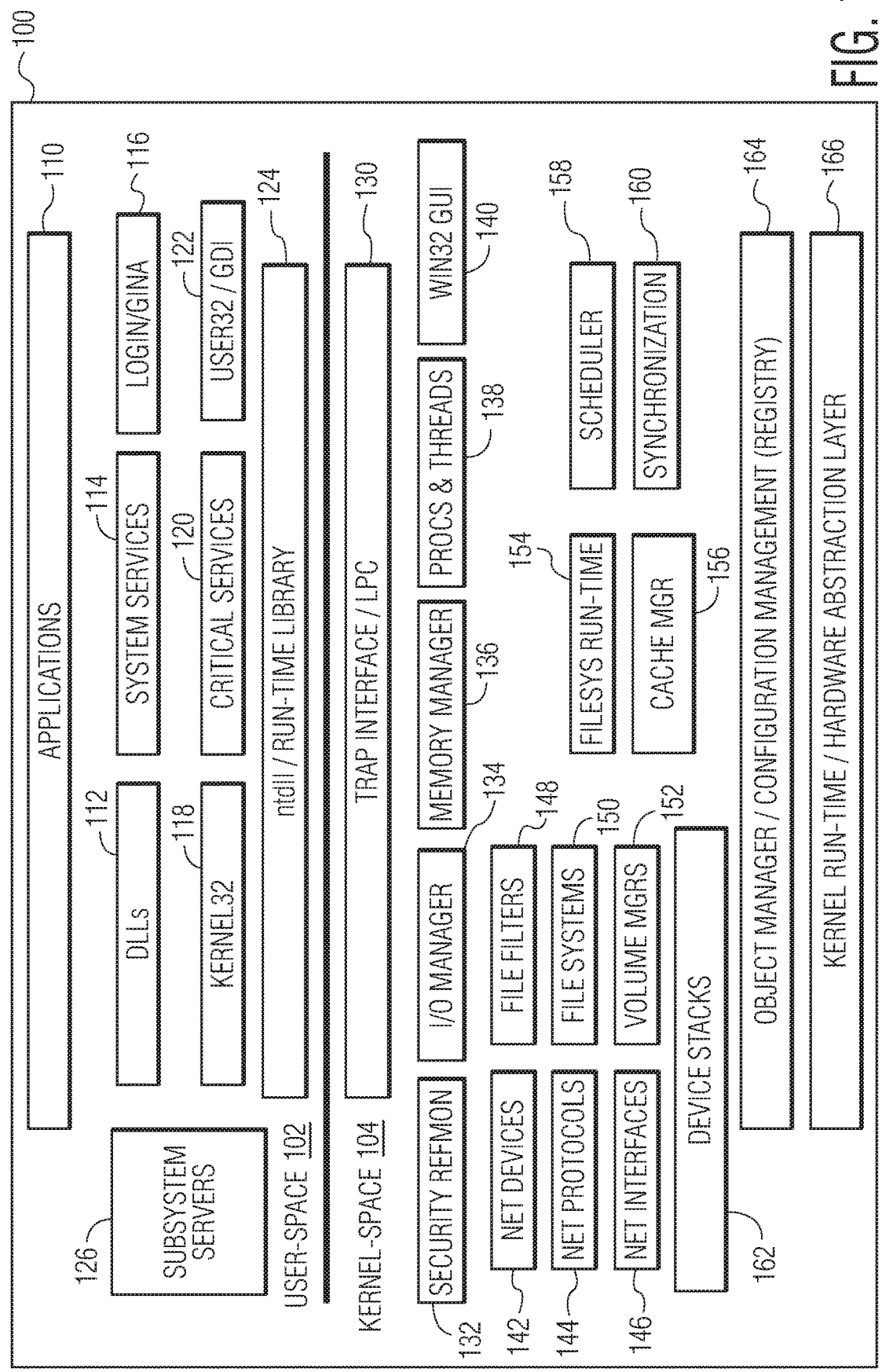
FIG. 1 depicts an example embodiment of an operating system architecture, in particular, a WINDOWS operating system architecture that executes on a client device.

FIG. 1 depicts an example embodiment of an operating system architecture 100, in particular, a WINDOWS operating system architecture that executes on a client device. As shown in FIG. 1 and as is well known in the field, the operating system architecture is divided into a user-space 102 and a kernel-space 104. In the embodiment of FIG. 1, components in the user-space include applications 110, dynamic link libraries (DLLs) 112, system services 114, login/graphical identification and authentication (GINA) 116, kernel32 118, critical services 120, user32/graphical device interface (GDI) 122, ntdll (NT layer DLL)/run-time library 124, and subsystem servers 126. Such components of an operating system are known in the field and thus may not be described in further detail herein. In the embodiment of FIG. 1, components in the kernel-space include trap interface/local procedure call (LPC) 130, security refmon (reference monitor) 132, I/O manager 134, memory manager 136, processes and threads 138, win32 graphical user interface (GUI) 140, Net devices 142, Net protocols 144, Net Interfaces 146, file filters 148, file systems 150, volume managers 152, filesys run-time 154, cache manager 156, scheduler 158, synchronization 160, device stacks 162, an object manager/configuration management (registry) 164, and kernel run-time/hardware abstraction layer 166. Such components of an operating system are known in the field and thus may not be described in further detail herein. Although not shown in FIG. 1, the WINDOWS architecture executes on hardware, for example, hardware fully contained on a personal computing device such as a desktop computer, a laptop computer, etc. As is known in the field, the hardware may include memory (e.g., ROM, RAM, and persistent memory such as a hard disk and/or FLASH memory) and at least one central processing unit. Although the operating system architecture of FIG. 1 is provided as an example, the below-described techniques are applicable to operating system architectures with different configurations and/or with more or less components than those shown in FIG. 1.

Applications executed in an operating system architecture include office productivity applications such as word processors, spreadsheets, and presentation applications, application plug-ins, communications applications such as web browsers, and a multitude of enterprise applications, e.g., accounting, personnel management, sales, product management, project management, etc. In an embodiment, applications may work in tandem with each other. In another embodiment, an application may be formed by a combination of applications that work in tandem with each other. For example, a web browser plug-in may work in tandem with a web browser and the combination of the web browser plug-in and the web browser is referred to as an application. As mentioned above, traditional desktop applications have been "virtualized" such that "virtualized applications" can be run at a local machine with less dependency on the specific configuration (e.g., operating system version) of the local machine. Application virtualization is a technique in which an application is decoupled from the underlying operating system of the local machine on which the application executes. Various techniques for application virtualization are known in the field. In general, a "virtualized application" or "application virtualization" involves techniques that decouple applications from the underlying operating system of the client device. In an embodiment, decoupling applications from the underlying operating system of the client device involves separating, dividing, insulating, and/or protecting the operating system from the virtualized application. For example, an application is virtualized so that when the application is installed on a client device, the application does not write or dilute the operating system files or registries and/or does not corrupt the operating system itself. In an embodiment, an application virtualization layer creates a "sandbox," which is an insulated environment on the client device. For example, a "sandbox" may include controls that limit access by the application to files, registries, certain hardware, and/or certain other applications. Application virtualization can utilize user-space/user-mode (referred to herein as "user-space") virtualization techniques and/or kernel-space/kernel-mode (referred to herein as "kernel-space") virtualization techniques. In an embodiment, user-space virtualization can be implemented without needing administrative rights to access certain resources, such as certain files/registries. In an embodiment, a virtualized application is not installed on the client device in a conventional manner in that in a convention installation the application declares, while installing on the operating system, that the application is installing and hence the operating system is aware that something was installed. Additionally, in a conventional installation, the application writes specific files/registries in the installation areas of the registry (e.g., protected areas of the memory that require admin rights to access) to make the operating system aware of the application. On the other hand, in an embodiment, a virtualized application does not declare to the operating system that the application is installing. Therefore, the operating system does not necessarily know that an application was installed at least because the application writes all the files and registries used by the application to run in a virtualized file system and a virtualized registry area. In an embodiment, a virtualized file system and virtualized registry are files and registries that are created in a separate location (e.g., a separate namespace) other than the operating system's default location. Locating such files in a separate location (e.g., in a separate namespace) is a technique used to sandbox, or "containerize," the files and/or registries used by the application. Using the virtualized file system and virtualized registry, the operations triggered by the application will be performed on the virtual files and/or registries to prevent the application from reading/writing to the system folders and registries of the operating system. For example, an application might require its files to be in "c:\ProgramFiles\ApplicationVendor\ApplicationName." In an embodiment, these files are virtualized so that when the application looks for files in "c:\ProgramFiles\ApplicationVendor\ApplicationName" the file system API calls are redirected to "c:\Sandbox\ProgramFiles\ApplicationVendor\ApplicationName."

An application that is installed in a conventional matter is often referred to as a "native" application whereas an application installed using a virtualized file system and a virtualized registry area is referred to as a "virtualized application." In an embodiment, execution of a virtualized application at run-time is controlled by the application virtualization layer. In an embodiment, a virtualized application appears to a user to interface directly with the client device's operating system, but the virtualized application interfaces with the application virtualization layer. In an embodiment, the application virtualization layer intercepts communications between the application and the operating system and acts as a proxy between the application and the native system registries and system files of the operating system running on the client device. In an embodiment, the application virtualization layer can implement virtual registry files and secure file stores within the sandbox.

Techniques for application virtualization can be broadly categorized as "agent-less" application virtualization or "agent-based" application virtualization. While creating a virtual application package, the application and client components are compiled and stored in one single package or container, for example, a single executable. Such virtualized applications are fully encapsulated and able to run as a standalone executable from multiple locations such as a network drive, local drive, or USB removable storage device. In an embodiment, every instance of a virtualized application contains a "built-in" agent. Therefore, no agent, or client-component, is installed in the operating system of the local machine but the virtualized application has an agent that is used at run-time.

On the other hand, client-based, or agent-based, application virtualization involves the use of a locally installed agent or client, wherein the agent is "installed" on the local machine in a conventional sense such that the operating system is aware that the agent is locally installed. Such a locally installed agent, or virtualization engine, contains functionality to set up and maintain a virtual environment for each virtualized application. The locally installed agent implements management tasks such as File Type Association (FTA) registration and shortcut creation, which are important functions of agent-based application virtualization solutions such as App-V.

The WINDOWS operating system runs all code, applications, and services, in one of two modes, user-mode (user-space) and kernel-mode (kernel-space). As is known in the field, the two modes utilize two different security/access models. Code running in kernel-space has full operating system access. Kernel-space functions typically come from device drivers and from the WINDOWS kernel itself. A kernel-space driver or service is part of a locally installed agent on the local machine. Problems when executing code in kernel-space can quickly lead to complete system halts (e.g., the Blue Screen Of Death). Kernel-space drivers need admin privileges to be initially installed while user-space agents do not need admin privileges. Code running in user-space does not have full operating system access and there is no direct interaction with the kernel of the operating system running on the local machine.

Figure 2:
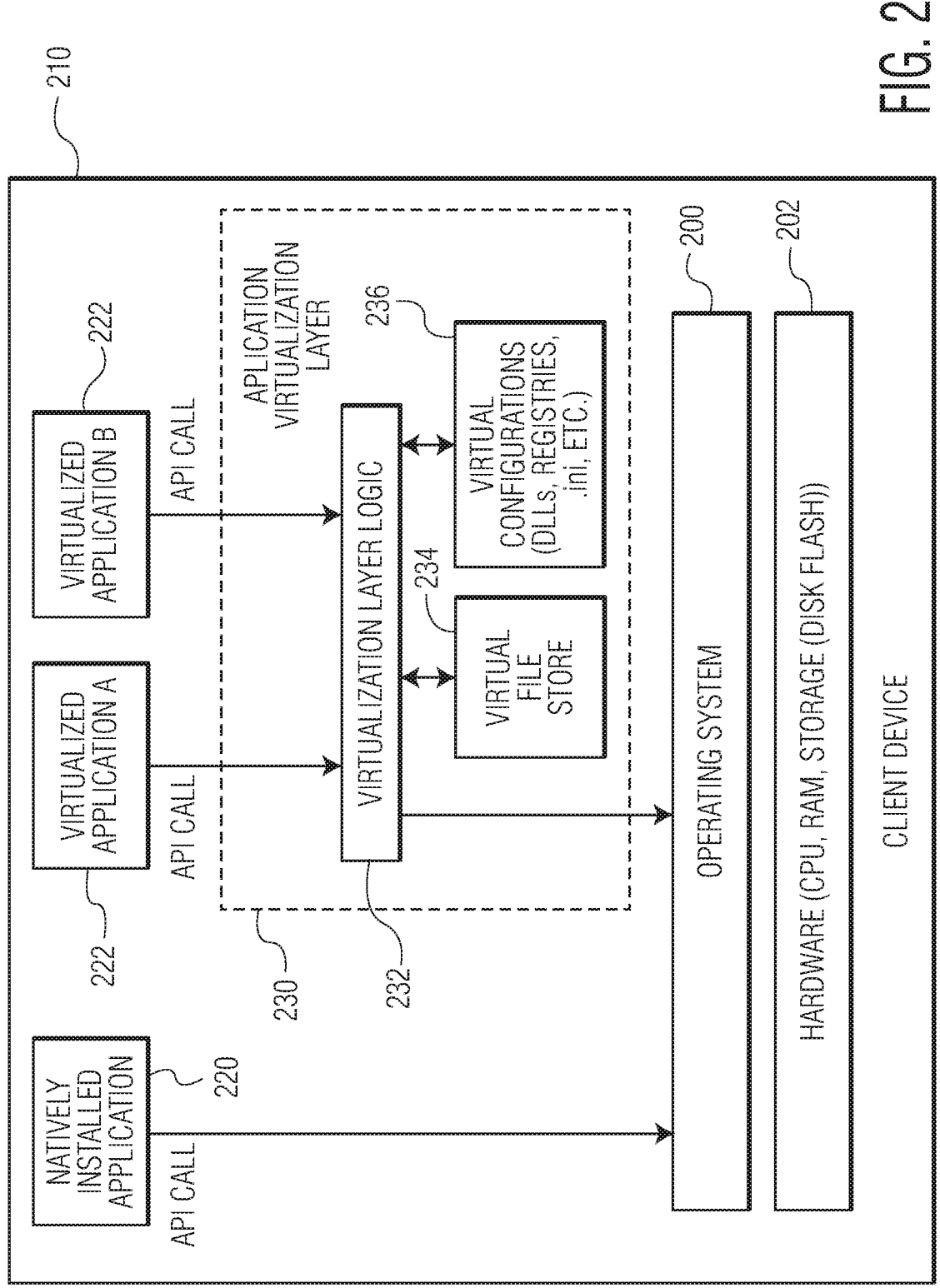
FIG. 2 illustrates the interaction of an operating system with both natively installed applications and virtualized applications.

FIG. 2 depicts a client device 210 having an operating system 200 and hardware 202. FIG. 2 illustrates the interaction of the operating system with both a natively installed application 220 and virtualized applications 222, application A and application B. As illustrated in FIG. 2, natively installed applications interact directly with the operating system and the virtualized applications interact with an application virtualization layer 230 that includes virtualization layer logic 232, a virtual file store 234, and virtual configurations (e.g., DLLs, registry, .ini, etc.) 236. As illustrated in FIG. 2, API calls generated from the natively installed application interact directly with the operating system, however, API calls generated from the virtualized applications are intercepted by the application virtualization layer. The application virtualization layer virtualizes the intercepted API calls and passes the virtualized API calls to the operating system for execution. In an embodiment, virtualizing an API call involves redirecting an aspect of the API call, such as a DLL path and/or a file path to the virtual file store and/or to the virtual configurations (e.g., DLLs, registry, .ini, etc.). The application virtualization layer may operate in the user-space, in the kernel-space, or in both the user-space and the kernel-space.

Various different vendors provide application virtualization and/or virtualized applications according to vendor-specific techniques. Examples of commercial application virtualization solutions include Cameyo, Citrix Application Streaming, XenApp, Numescent Application Jukebox, MICROSOFT App-V, Symantec Workspace Virtualization, and VMware ThinApp.

App-V is an example of an agent-based application virtualization solution that operates on kernel-space code and requires an agent or client to be locally installed on the machine that executes the operating system. Such an agent, or virtualization engine, contains the code to set up and maintain a virtual environment for each virtualized application. The locally installed agent implements management tasks such as FTA registration and shortcut creation.

An application virtualization layer may be implemented through a set of components (e.g., files) that, when executed, constitute the application virtualization layer. Virtualized applications may be organized and stored as a "package," which includes a set or bundle of files that are used to run the virtualized application. In an embodiment, application packages can be stored on a virtualized application portal for access by the client devices. FIG. 3 depicts a table that includes components of an App-V version 5.x application package. Application packages that use different virtualization techniques may include a different set of files. The table depicted in FIG. 3 includes a column that indicates a file type/name and a column that provides a description of the contents and/or functionality of the corresponding file type/name.

In an embodiment, files packaged within the container/sandbox of a virtualization layer are selected to make sure that the files are compatible with the requirements of the application being virtualized. For example, an application running on WINDOWS XP (WinXP) needs DLLs available on WinXP. The application might fail to run on WINDOWS 10 (Win10) as the DLLs on Win10 are different from that of WinXP. Application virtualization fixes such operating system compatibility issues by packaging the DLLs from WinXP as part of the virtual configuration files so that the application accesses WinXP DLLs even if the client device is running Win10 as the operating system.

Packaging applications for application virtualization can be a resource intensive process and many known applications have been virtualized by one vendor or another. In some cases, a vendor may have an extensive library of virtualized applications that provides features that work well for their intended purpose. Likewise, another vendor may have a library of virtualized applications that provide a different set of features that work well for their intended purpose. Additionally, some applications may be difficult to virtualize by a particular vendor (e.g., due to the virtualization technique that is used by the vendor) or a particular vendor may not offer certain features that may be desirable to an end-user.

In accordance with an embodiment of the invention, compound virtualization is applied to an application to utilize features of both a primary virtualization layer and a complimentary virtualization layer. For example, the primary virtualization layer and the complimentary virtualization layer are sequentially applied to an application so that features of the complimentary virtualization layer can be utilized along with features of the primary virtualization layer. In an embodiment, an API call is subjected to a complimentary application virtualization layer, and after the API call is subjected to the complimentary application virtualization layer, the API call is subjected to a primary application virtualization layer. After the API call has been subjected to the complimentary application virtualization layer and to the primary application virtualization layer, the API call is forwarded to the operating system for processing in the kernel-space. For example, an application that is virtualized at a primary virtualization layer (e.g., an App-V application) that operates in the kernel-space can first be virtualized by a complimentary virtualization layer that operates in the user-space to enable complimentary features such as operating system compatibility, licensing, authentication, and usage reporting. In an embodiment, compound virtualization may utilize "stacked" application virtualization layers that operate at different levels of the operating system stack, e.g., a complimentary application virtualization layer that operates in the user-space is stacked on top of a primary virtualization layer that operates in the kernel-space. In another embodiment, a web browser plug-in application that is virtualized at a primary virtualization layer (e.g., using App-V techniques) that operates in the kernel-space is packaged with a web browser (e.g., MICROSOFT Internet Explorer) that is virtualized at a complimentary virtualization layer that operates in the user-space so that features of the virtualized web browser plug-in can be utilized in conjunction with features of the virtualized web browser. In an example use case, a web browser plug-in is virtualized using App-V, which is considered the primary virtualization layer. However, the virtualized web browser plug-in is compatible with version 8 of Internet Explorer but not later versions, yet version 8 of Internet Explorer is not compatible with WINDOWS 10. Thus, version 8 of Internet Explorer is virtualized at the complimentary virtualization layer so that version 8 of Internet Explorer can run on WINDOWS 10 while the plug-in is able to run with version 8 of Internet Explorer. Thus, using compound virtualization, resources spent to virtualize an application using a primary virtualization layer (e.g., the virtualized web browser plug-in) can be utilized along with features that are offered by a complimentary virtualization layer (e.g., the virtualized version 8 of Internet Explorer) while running an operating system that is not directly compatible with either the web browser plug-in or the web browser, giving the end-user an experience that includes features of both virtualization layers.

Figure 4A:
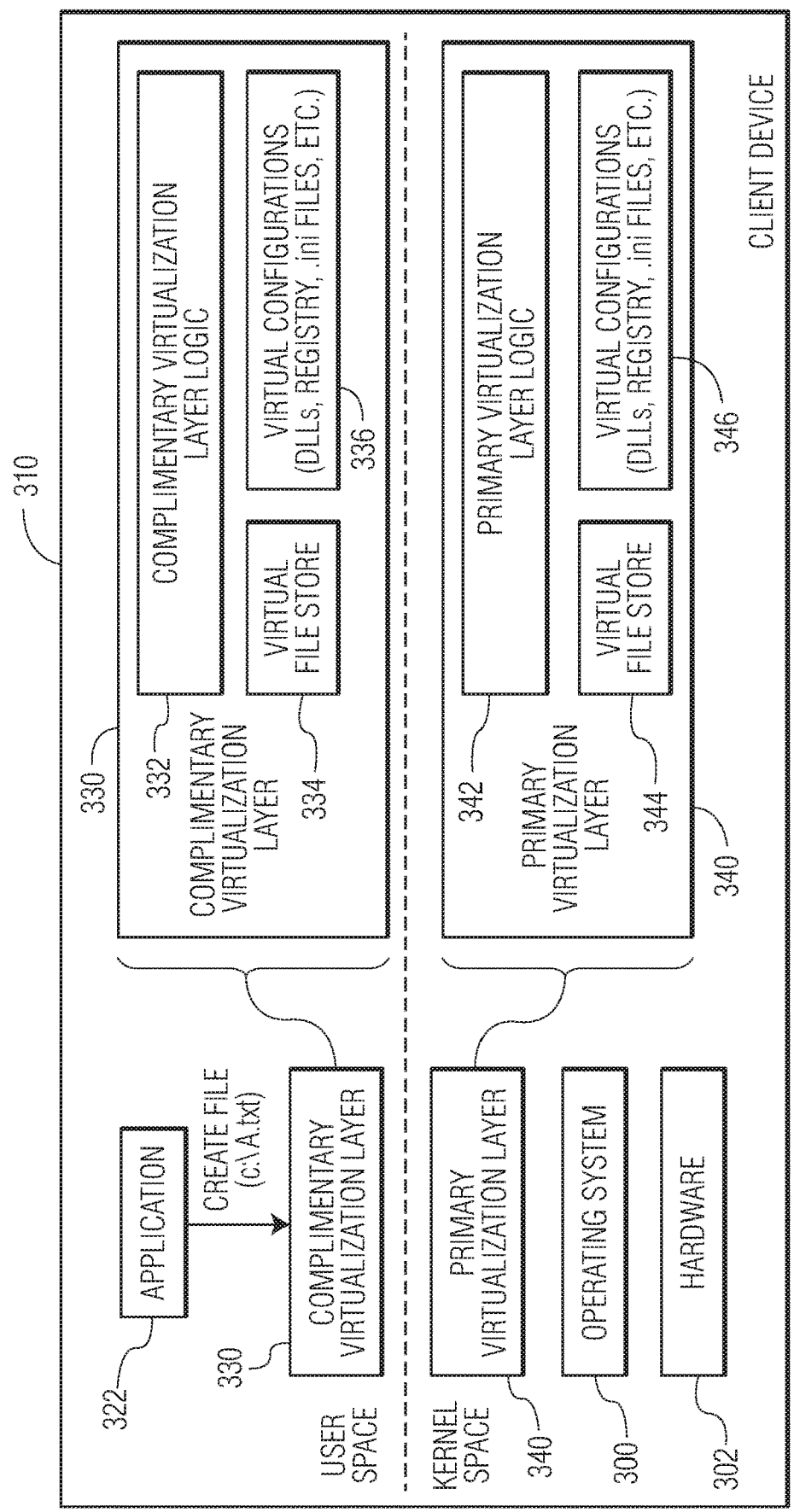
FIGS. 4A-4C illustrate an embodiment of a technique for running an application via an operating system that involves compound virtualization.
Figure 4B:
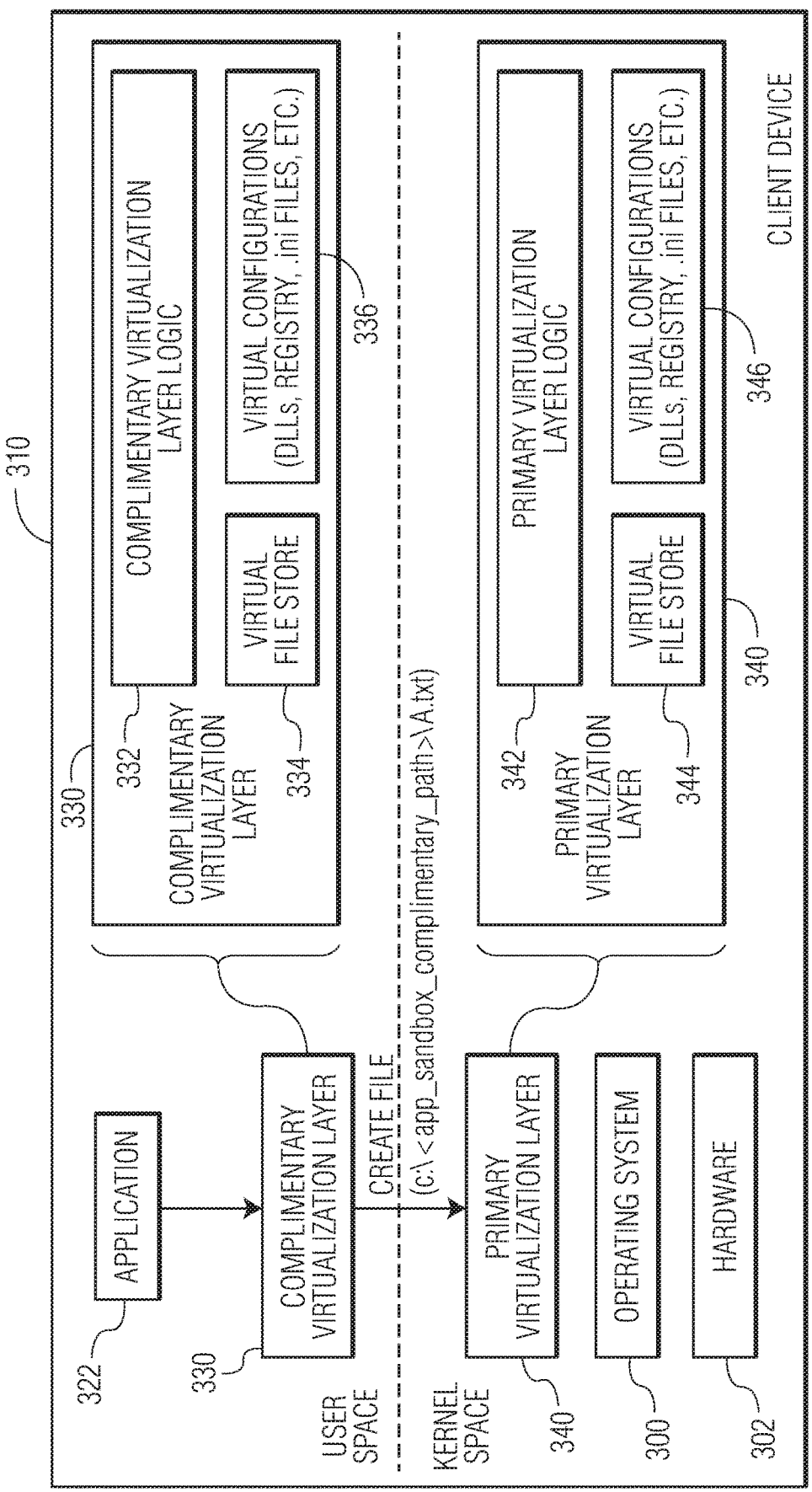
Figure 4C:
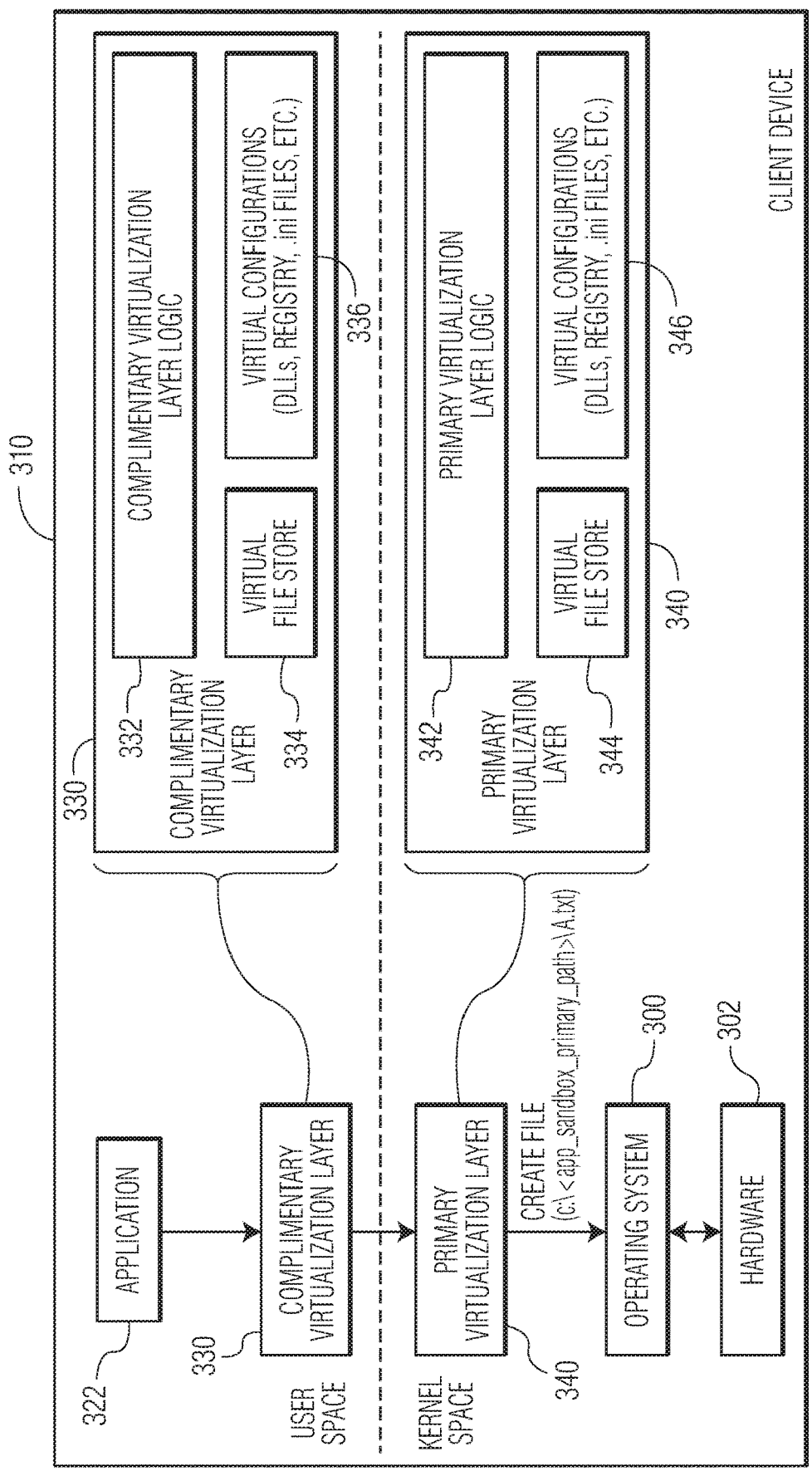

FIGS. 4A-4C illustrate an embodiment of a technique for running an application via an operating system of a client device that involves compound virtualization. As shown in FIG. 4A, components of a client device 310 include an application 322, a complimentary virtualization layer 330, a primary virtualization layer 340, an operating system 300, and hardware 302.

The application 322 can be, for example, an office productivity application such as a word processor, a spreadsheet, or a presentation application, a communications application such as a web browser, or an enterprise application, such as an accounting, personnel management, sales, product management, or project management application. In an embodiment, more than one application may be virtualized and contained within the same application virtualization package and may be referred to singularly as an application. For example, one portion of an application (e.g., a web browser) may be virtualized through the complimentary virtualization layer and another portion of the application (e.g., a web browser plug-in) may be virtualized through the primary virtualization layer.

In an embodiment, the complimentary virtualization layer 330 includes computer executable instructions and data, which when executed, virtualize API calls from the application to effectively virtualize the application. In an embodiment as indicated in the expanded view of FIG. 4A, the complimentary virtualization layer includes complimentary virtualization layer logic 332, a virtual file store 334, and virtual configurations 336. The virtual file store stores files that are within the namespace that includes the sandbox created by the complimentary virtualization layer. The files stored in the virtual file store may include any data associated with the application. In an embodiment, the virtual file store uses a namespace that is specific to the complimentary virtualization layer and that can be accessed without admin rights. The virtual configurations stores files such as DLLs, registries, and .ini files used to virtualize the application. The virtual configuration files may include DLLs, registries, .ini files. The complimentary virtualization layer logic intercepts and interprets the API calls and interacts according to a set of layer-specific virtualization rules with the virtual file store and the virtual configurations to generate virtualized API calls. In an embodiment, the complimentary virtualization layer logic and virtual configurations apply redirection rules and act as a redirection engine that is specific to the complimentary virtualization layer.

The primary virtualization layer 340 includes computer executable instructions and data, which when executed, virtualize API calls from the application. In an embodiment as indicated in the expanded view, the primary virtualization layer includes primary virtualization layer logic 342, a virtual file store 344, and virtual configurations 346. The virtual file store stores files that are within the namespace that includes the sandbox created by the primary virtualization layer. The files stored in the virtual file store may include any data associated with the application. In an embodiment, the virtual file store uses a namespace that is specific to the primary virtualization layer. The virtual configurations stores files such as DLLs, Registries, and .ini files used to virtualize the application. The primary virtualization layer logic intercepts and interprets the API calls and interacts according to a set of layer-specific virtualization rules with the virtual file store and the virtual configurations to generate virtualized API calls. In effect, the primary virtualization layer logic and virtual configurations apply redirection rules and act as a redirection engine that is specific to the primary virtualization layer.

As illustrated in FIG. 4A, the complimentary virtualization layer 330 and the primary virtualization layer 340 are separate and distinct virtualization layers in that each layer includes its own virtualization layer logic, its own virtual file store, and its own virtual configurations. The two separate and distinct virtualization layers apply separate and distinct sets of virtualization rules and/or redirection rules. For example, the complimentary virtualization layer uses its own set of redirection rules, virtual files, and virtual registries packaged as part of its container, whereas the primary virtualization layer uses its own, different, set of redirection rules, virtual files, and virtual registries as part of its own container. Thus, compound virtualization involves two separate and distinct virtualization layers imposing their own virtualization logic to operate on the API calls triggered by the application at different levels.

The operating system 300 illustrated in FIG. 4A may be an operating system such as the WINDOWS operating system, which is described above. Alternatively, the operating system may be an operating system other than the WINDOWS operating system, such as, for example, the APPLE OS X operating system and Unix-like operating systems.

The hardware 302 illustrated in FIG. 4A may include memory (e.g., ROM, RAM, and persistent memory such as a hard disk or FLASH memory) and at least one central processing unit as is known in the field.

With reference to FIG. 4A, when the application 322 is running, certain API calls will be made by the application. For example, an API call to create a file may be made by the application. The API call is generated by the application in the user-space as is known in the field. As shown in FIG. 4A, the API call is an API call to create a file, "A.txt," which is to be located in the memory of the client device at path c:\A.txt. As is known in the field, the application may generate other API calls to implement other functionality.

With reference to FIG. 4B, the API call is intercepted by the complimentary virtualization layer 330 and processed by the corresponding complimentary virtualization layer logic 332. In an embodiment, as part of virtualizing the application, the complimentary virtualization layer virtualizes the API call by redirecting an aspect of the API call (e.g., a DLL path, a file path, etc.) to a location within the sandbox created by the complimentary virtualization layer. For example, the complimentary virtualization layer redirects the file location of the API call to:

c:\<app_sandbox_complimentary_path>\A.txt

Given the redirection, the corresponding file "A.txt" will be created at the location "c: \<app_sandbox_complimentary_path>." In an embodiment, the location "c: \<app_sandbox_complimentary_path>" is in the user-space and the location does not require admin rights to create, access, modify, and/or delete the file. The virtualized API call is then passed from the complimentary virtualization layer.

With reference to FIG. 4C, the virtualized API call passed from the complimentary virtualization layer 330 is intercepted by the primary virtualization layer 340 and processed by the corresponding primary virtualization layer logic 342. In an embodiment, as part of virtualizing the application, the primary virtualization layer again virtualizes the virtualized API call, which includes redirecting an aspect of the API call (e.g., a DLL path, a file path, etc.) to a location within the sandbox created by the primary virtualization layer. For example, the primary virtualization layer redirects the API call to:

c:\<app_sandbox_primary_path>\A.txt

The resulting virtualized API call is referred to as a compound virtualized API call because the API call has been virtualized by two separate and distinct virtualization layers. The compound virtualized API call is then passed to the operating system, e.g., kernel-space services/drivers of the operating system, for execution of the function or functions associated with the API call. A response related to execution of the function or functions associated with the API call may be passed back up through the primary virtualization layer and then through the complimentary virtualization layer. In an embodiment, when the operating system sends back the response, any or both the virtualization layers may perform more operations on the data returned by the operating system depending on the result of the API call and the rules programmed into the corresponding virtualization layer logic.

Figure 5:
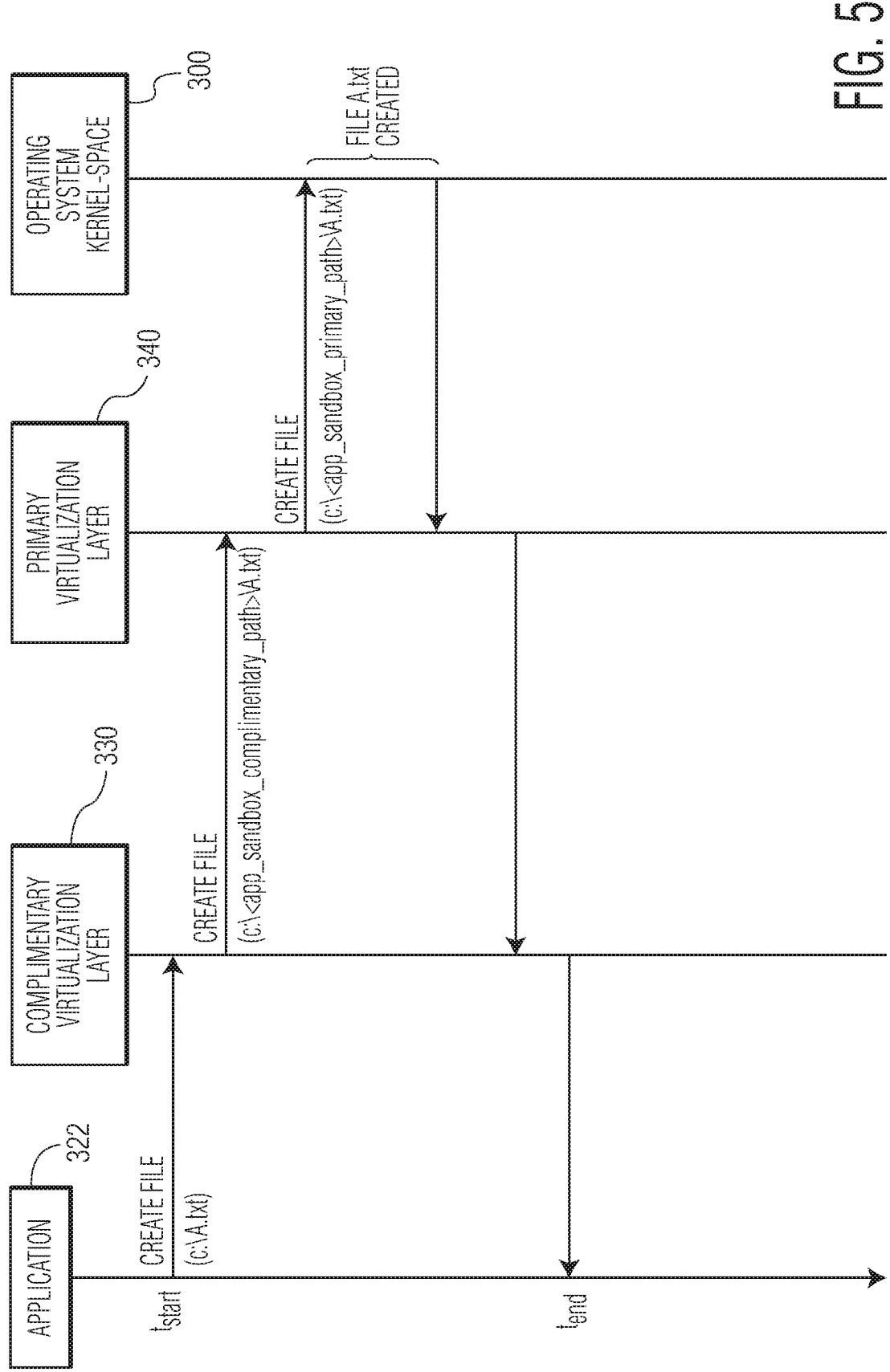
FIG. 5 depicts a timeline of interactions between the components shown in FIGS. 4A-4C.

FIG. 5 depicts a timeline of interactions between the components shown in FIGS. 4A-4C. At time, $t_{start}$, the application generates an API call to create a file. The file is to be created and stored as c:\A.txt. At a subsequent time, the API call is intercepted by the complimentary virtualization layer and a virtualized API call is generated. The virtualized API call includes the redirected path:

c:\<app_sandbox_complimentary_path>\A.txt

At a subsequent time, the virtualized API call is then passed from the complementary virtualization layer and intercepted by the primary virtualization layer and processed by the primary virtualization layer logic. The primary virtualization layer again virtualizes the API call and redirects the file path to:

c:\<app_sandbox_primary_path>\A.txt

At a subsequent time, the compound virtualized API call is passed from the primary virtualization layer and received by the operating system, e.g., kernel-space component(s) of the operating system. The operating system executes the code associated with the compound virtualized API call, which, in the above example, causes a file A.txt to be created according to the compound virtualized API call. For example, a file is created at the location specified by the compound virtualized API call. The file is created and a response is passed back up through the primary virtualization layer and the complementary virtualization layer to the application. In particular, at a subsequent time, a first response is generated by the operating system and intercepted by the primary virtualization layer for processing by the corresponding primary virtualization logic. At a subsequent time, a second response is generated by the primary virtualization layer and intercepted by the complimentary virtualization layer for processing by the complimentary virtualization layer logic. At a subsequent time, a third response is generated by the complimentary virtualization layer and passed to the application, which receives the response at time, $t_{end}$. In an embodiment, the first, second, and/or third responses may not be modified relative to the preceding response such that the response is simply passed through the primary virtualization layer and/or the complimentary virtualization layer.

As illustrated in FIG. 5, the API call is first intercepted by the complimentary virtualization layer and then intercepted by the primary virtualization layer. Because the API call is first intercepted by the complimentary virtualization layer, features of the complimentary virtualization layer can be applied to the application in addition to features of the primary virtualization layer that are applied to the application. Furthermore, the additional features can be applied without modifying the primary virtualization layer such that application of the complimentary virtualization layer is transparent to the primary virtualization layer.

Figure 6:
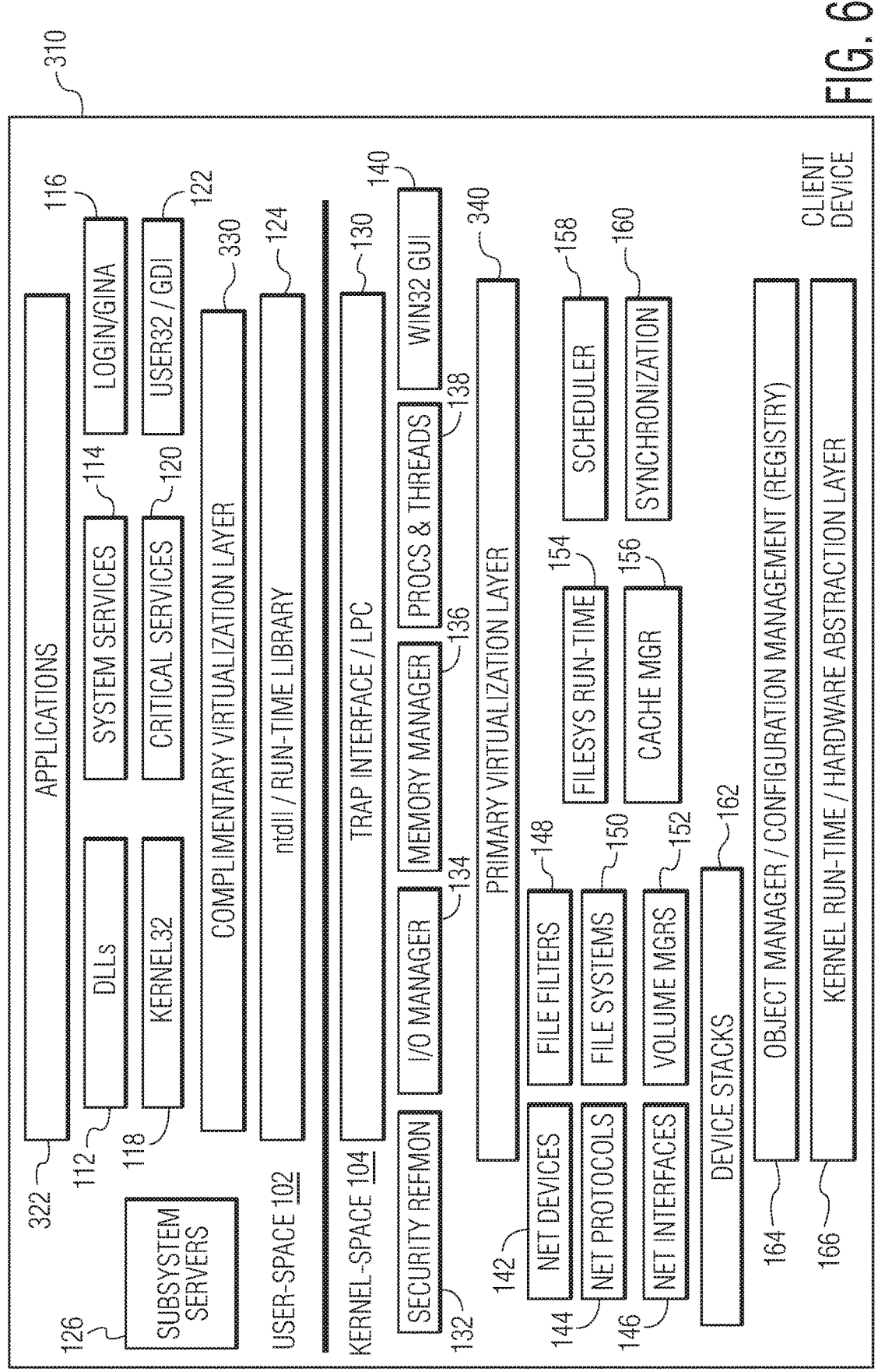
FIG. 6 depicts an embodiment of a WINDOWS architecture that includes a complementary virtualization layer and a primary virtualization layer.

FIG. 6 depicts an embodiment of a WINDOWS architecture, which is similar to the architecture of FIG. 1, but that includes a complementary virtualization layer 330 and a primary virtualization layer 340. The complementary virtualization layer is graphically depicted as being located in the user-space 102 above the ntdll level 124 and the primary virtualization layer 340 is graphically depicted as being located in the kernel-space 104 above the filesystem components of the operating system but below the complementary virtualization layer. In an embodiment, the complementary and primary virtualization layers can be anywhere in the architecture as shown in FIG. 6 as long as the complementary virtualization layers is above the primary virtualization layer. In one embodiment, the complementary virtualization layer functions in the user-space only while the primary virtualization layer functions in the user-space and the kernel-space. In an embodiment, the terms "above" and "below" describe the position of the components in the operating system stack and a component that is located "above" another component will process an API call from an application before the component that is below. Thus, in an embodiment, the terms "above" and "below" have a temporal relationship in which the component that is above acts on an API call earlier in time than a component that is below the other component. Locating the complementary virtualization layer below the application but above the primary virtualization layer in the layer stack allows API calls to be subjected to the complementary virtualization layer before being subjected to the primary virtualization layer. In an embodiment, the configuration of the complimentary virtualization layer relative to the primary virtualization layer as illustrated in FIG. 6 enables the functionality as illustrated in FIGS. 4A-4C and 5. For example, because the complimentary virtualization layer is stacked on top of the primary virtualization layer, the complimentary virtualization layer intercepts the API calls from the application before the API calls reach the primary virtualization layer. Although the complimentary virtualization layer is illustrated as being in the user-space and the primary virtualization layer is illustrated as being in the kernel-space, the complimentary virtualization layer and the primary virtualization layer could both be located in the user-space or could both be located in the kernel-space as long as the complimentary virtualization layer is configured to intercept API calls from the application before the primary virtualization layer, e.g., as long as the complimentary virtualization layer is higher in the operating system stack than the primary virtualization layer.

In an embodiment, the complimentary virtualization layer logic 332 of the complimentary virtualization layer 330 is configured to implement hooking and redirection of the function calls (e.g., function calls related to API calls) made by the application to the handlers written for the specific application. In an embodiment, the complimentary virtualization layer implements hooking by parsing the raw opcodes of the functions (e.g., API calls) and over-writing a jump instruction instead of the actual code. The jump instruction is written at the very beginning of the function call, however, the opcodes, which translate into an instruction cannot be broken in between, as breaking the opcodes in between may cause the operating system to incorrectly interpret certain data as instructions and crash the application. Thus, to implement the hooking, the opcodes are analyzed beforehand to find the length of each instruction, which may consist of 1-3 opcodes, followed by a few bytes of data for the opcodes. In an embodiment, two different techniques for hooking are implemented depending on what the initial opcodes are. A first technique involves scanning for the length of initial opcodes and removing the initial bytes of an opcode sufficient to insert the desired jump instruction to the function written as part of the complementary virtualization layer logic. This function is configured to check the complementary virtualization layer's rules engine to determine whether the call is to be redirected to the sandbox of the complementary virtualization layer or not. Sometimes the initial opcodes consist of a jump instruction. In this case and according to a second technique, the jump destination is followed and the jump destination is replaced to point to the function written as part of the complementary virtualization layer logic. This function is configured to check the complementary virtualization layer's rules engine to determine whether the call is to be redirected to the sandbox of the complementary virtualization layer or not. The redirected function then jumps back to the original jump location.

Figure 7:
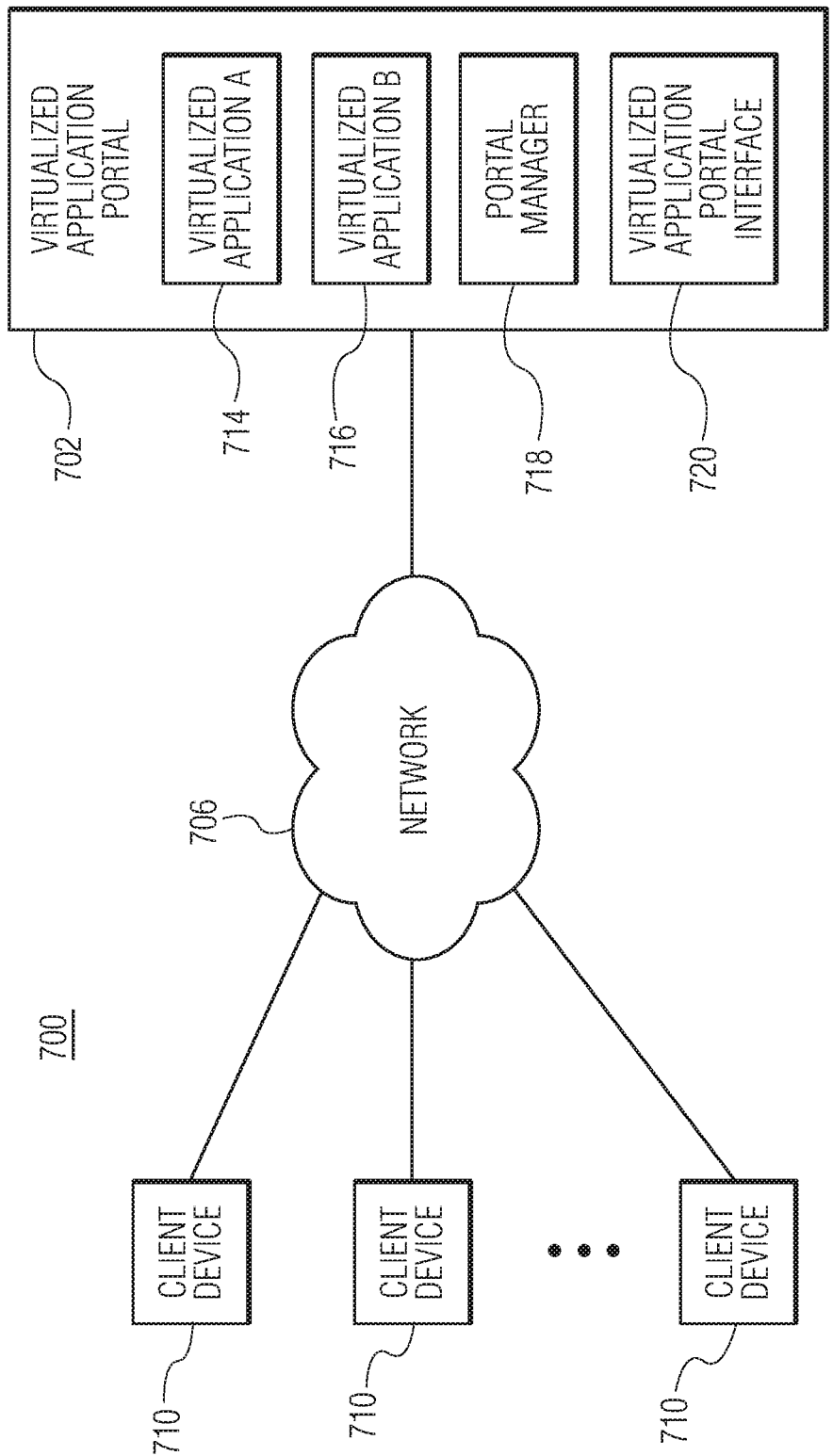
FIG. 7 depicts an example of a system for deploying virtualized applications.

In an embodiment, applications can be packaged and stored as application packages on a virtualized application portal. Such application packages, which include application virtualization packages for compound virtualization, can then be accessed and downloaded by client devices for execution at the respective client devices. FIG. 7 depicts an example of a system 700 for deploying virtualized applications. The example system includes a virtualized application portal (VAP) 702, a network 706, and at least one client device 710. In an embodiment, the virtualized application portal includes one or more servers that support at least one virtualized application 714 (e.g., virtualized application A and virtualized application B), a portal manager 718, and at least one virtualized application portal interface 720. In an embodiment, the virtualized applications may include applications such as productivity tools and database management tools. In an embodiment, the portal manager may include various components such as a customer administrator component, an application usage component, a user management component, an application management component, and a package manager. In an embodiment, the virtualized application portal interface may include various components that enable communications with application users, customer administrators, portal administrators, and application packagers.

In an embodiment, the virtualized application portal 702 is implemented on one or more computing devices, such as a server that includes at least one processor and memory as is known in the field. In an embodiment, the server includes at least one processor and memory and executes computer readable instructions. In an embodiment, the server includes a processor, memory, at least one user interface, and a communications interface. The processor may include a multifunction processor and/or an application-specific processor. The memory within the computer may include, for example, a storage medium such as read only memory (ROM), flash memory, random access memory (RAM), and large capacity permanent storage devices such as hard disk drives. The user interface may include, for example, a keyboard, a mouse, a display, and/or a touch display. The communications interface enables communications with other computers via, for example, a local area network (LAN) protocol such as Ethernet and/or the Internet Protocol (IP). The computer readable instructions stored in the storage medium are configured to implement various tasks as described herein. In an embodiment, the server runs an operating system, such as the WINDOWS SERVER operating system from MICROSOFT. Although a server running the WINDOWS SERVER operating system is described, servers that run other operating systems are possible.

In an embodiment, the network 706 utilizes wired and/or wireless communications techniques as are known in the field. The network may include a LAN that utilizes LAN technologies, a wide area network (WAN) that utilizes WAN technologies, or a combination of a LAN and a WAN. In one embodiment, at least one portion of the network includes the Internet.

In an embodiment, the client devices 710 are computing systems, such as desktop computers, laptop computers, tablets, and/or smartphones, which include at least one processor and memory and execute computer readable instructions. In an embodiment, the computing devices include a processor, memory, at least one user interface, and a communications interface. The processor may include a multifunction processor and/or an application-specific processor. Examples of processors include the POWERPC family of processors by IBM and the x86 family of processors by INTEL. The memory within the computing system may include, for example, a storage medium such as ROM, flash memory, RAM, and a large capacity permanent storage device such as a hard disk drive. The user interface may include, for example, a keyboard, a mouse, a display, and/or a touch display. The communications interface enables communications with other computers via, for example, a wireless protocol, a LAN protocol such as Ethernet, and/or IP. The computing system executes computer readable instructions stored in the storage medium to implement various tasks as described herein. In an embodiment, the client device runs an operating system, such as the WINDOWS operating system from MICROSOFT. Although a client device running the WINDOWS operating system is described, client devices that run other operating systems are possible. In an embodiment, the computing system is a standalone machine that includes a processor and memory that run only one instance of an operating system and that are specific to the machine and not shared by other physically separated computer systems.

The system 700 described with reference to FIG. 7 is configured to enable deployment of virtualized applications from the virtualized application portal 702 to the client devices 710 for execution at the client devices, e.g., execution by a processor and memory that are unique to the client device and/or that are exclusive components of a standalone device such as a desktop computer, a laptop computer, a tablet, and/or a smartphone. As described above, a "virtualized application" or "application virtualization" involves techniques that decouple applications from the underlying operating system of the client device.

Referring again to FIG. 7, virtualized applications 714 (e.g., in the form of a virtualized application package) are stored at the virtualized application portal 702 and can be provided to the client devices 710 for use at the client devices. In accordance with an embodiment of the invention, virtualized applications are deployed from the virtualized application portal to the client devices in a manner that is quick and easy for a user of the client device. For example, the user can navigate using a browser to the virtualized application portal and can launch a virtualized application with a click on a corresponding application launch button. In an embodiment, applications virtualized using the above-described compound virtualization technique are deployed from the virtualized application portal. For example, virtualized application A and virtualized application B are stored at the virtualized application portal as compound virtualized application packages and can be accessed at the virtualized application portal and downloaded to a client device.

Figure 8A:
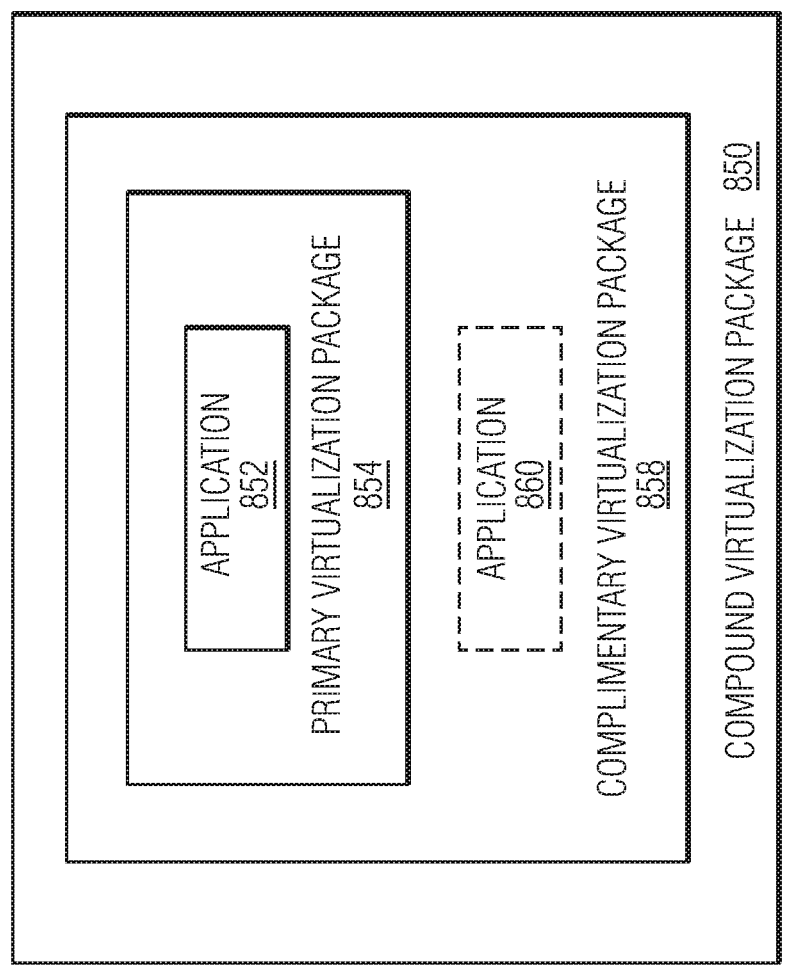
FIG. 8A depicts an example of an application virtualization package for compound virtualization illustrated in a block diagram.

FIG. 8A depicts an application virtualization package 850 for compound virtualization, referred to as a compound virtualization package, which can be stored at the virtualized application portal of FIG. 7 and downloaded to a client device for execution at the client device. The compound virtualization package includes an application 852 incorporated into a primary virtualization package 854 and the primary virtualization package incorporated into a complimentary virtualization package 858, where the complimentary virtualization package and the primary virtualization package include layer-specific virtualization logic files, virtual files stores, and virtual configurations (e.g., DLLs, registries, .ini, etc.) as described above with reference to FIGS. 4A-4C. In an embodiment, the primary virtualization package includes a first portion of the application 852 (e.g., a plug-in) and the complimentary virtualization package includes a second portion of the application 860 (e.g., a web browser). That is, the primary virtualization package includes the components needed to virtualize a web browser plug-in and the complimentary virtualization package includes the components needed to virtualize a web browser for use with the virtualized web browser plug-in.

Figure 8B:
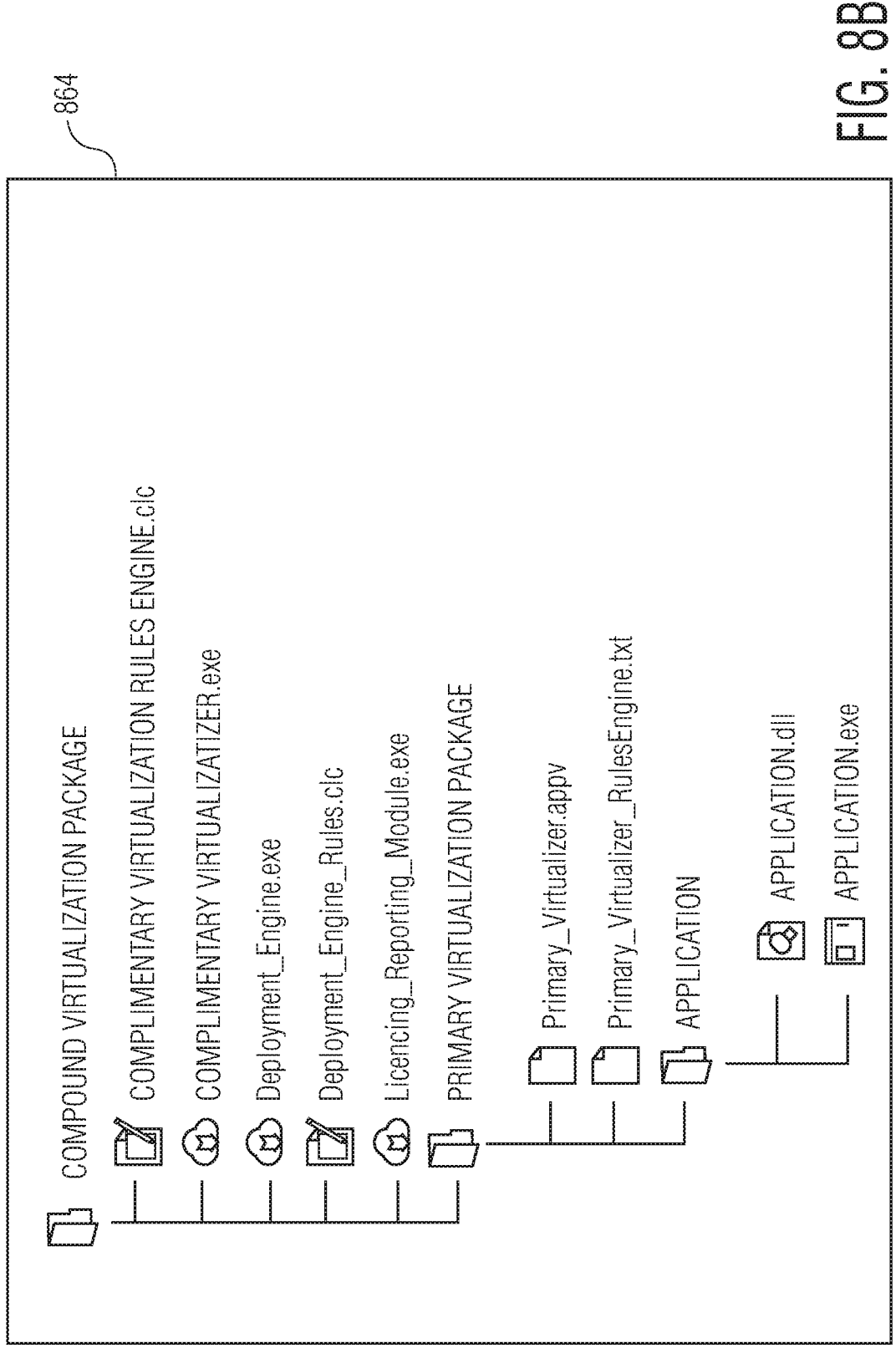
FIG. 8B depicts an example of an application virtualization package for compound virtualization illustrated in a file tree format.

FIG. 8B depicts an example of an application virtualization package for compound virtualization illustrated in a file tree format 864. The highest level of the tree structure is the compound virtualization package (e.g., the compound virtualization package namespace). The compound virtualization package includes a complimentary virtualization rules engine file (in .clc format), a complimentary virtualizer file (in .exe format), a deployment engine file (in .exe format), a deployment engine rules file (in .clc format), and a licensing reporting module file (in .exe format). The compound virtualization package also includes a primary virtualization package (e.g., the primary virtualization package namespace). The primary virtualization package includes a primary virtualizer files (in .appv format), and a primary virtualizer rules engine file (in .txt format). The primary virtualization package also includes an application (e.g., the application namespace). The application includes an application.dll file and an application.exe file. The file tree format of FIG. 8B corresponds functionally to the block diagram of FIG. 8A.

In an embodiment, the primary virtualization package 854 includes the components needed to virtualize an application, such as office productivity application, a web browser, or an enterprise application and the complimentary virtualization package includes components need to provide operating system compatibility (e.g., a virtualized legacy version of a web browser) and/or to provide a service such as license monitoring, authentication, and/or usage reporting to be used in addition to the virtualized application.

Figure 9:
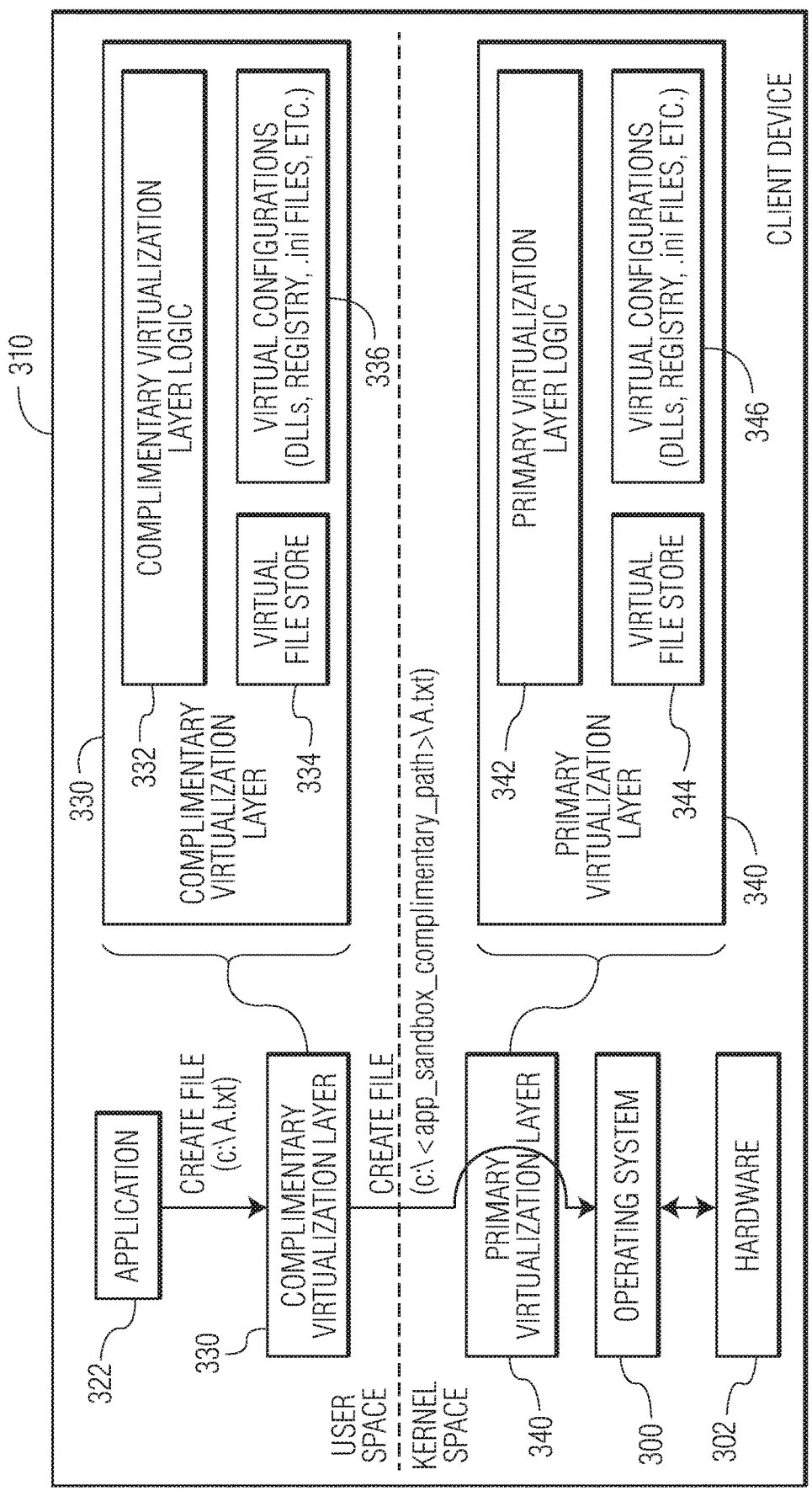
FIG. 9 illustrates an example embodiment in which an API call is virtualized by a complimentary virtualization layer but passed through unchanged by a primary virtualization layer.

In an embodiment, although an API call is intercepted by an application virtualization layer, the API call may be passed through the application virtualization layer without any changes. For example, no aspect of the API call is redirected to the corresponding virtual file store and/or to the virtual configurations (DLLs, registries, .ini, etc.). FIG. 9 illustrates an example embodiment in which an API call is virtualized by the complimentary virtualization layer 330 but passed through unchanged by the primary virtualization layer 340. As illustrated in FIG. 9, an API call to create a file is made by the application. The API call is an API call to create a file, "A.txt," which is to be located in the memory of the client device at path c:\A.txt. The API call is intercepted by the complimentary virtualization layer and processed by the corresponding complimentary virtualization layer logic. In an embodiment, as part of virtualizing the application, the complimentary virtualization layer virtualizes the API call by redirecting an aspect of the API call (e.g., a DLL path, a file path, etc.) to a location within the sandbox created by the complimentary virtualization layer. For example, the complimentary virtualization layer redirects the file location of the API call to:

c:\<app_sandbox_complimentary_path>\A.txt

Given the redirection, the corresponding file "A.txt" will be created at the location "c: \<app_sandbox_complimentary_path>." In an embodiment, the location "c:\<app_sandbox_complimentary_path>" is in the user-space and the location does not require admin rights to create, access, modify, and/or delete the file. The virtualized API call is then passed from the complimentary virtualization layer and is intercepted by the primary virtualization layer. As illustrated in FIG. 9, although an API call is intercepted by the primary virtualization layer, the API call is passed through the primary virtualization layer to the kernel-space components of the operating system without any changes. For example, no aspect of the API call is redirected to the corresponding virtual file store and/or to the virtual configurations (DLLs, registries, .ini, etc.).

Figure 10:
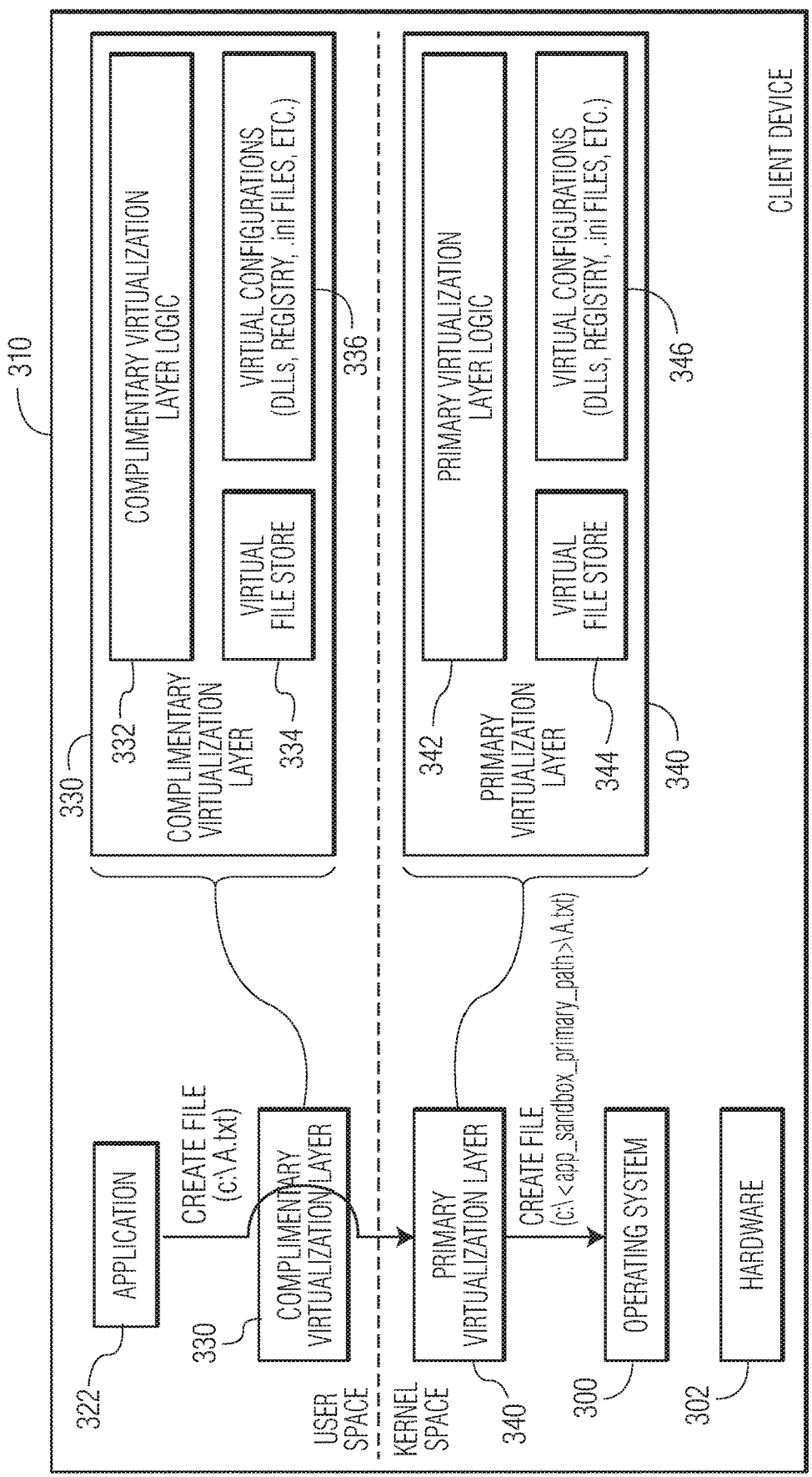
FIG. 10 illustrates an example embodiment in which an API call is passed through unchanged by a complimentary virtualization layer but virtualized by a primary virtualization layer.

FIG. 10 illustrates an example embodiment in which an API call is passed through unchanged by the complimentary virtualization layer 330 but virtualized by the primary virtualization layer 340. As illustrated in FIG. 10, an API call to create a file is made by the application. The API call is an API call to create a file, "A.txt," which is to be located in the memory of the client device at path c:\A.txt. The API call is intercepted by the complementary virtualization layer but is passed through the complimentary virtualization layer without any changes being made to the API call. The API call is intercepted by the primary virtualization layer and processed by the corresponding primary virtualization layer logic. In an embodiment, as part of virtualizing the application, the primary virtualization layer virtualizes the API call by redirecting an aspect of the API call (e.g., a DLL path, a file path, etc.) to a location within the sandbox created by the primary virtualization layer. For example, the primary virtualization layer redirects the file location of the API call to:

c:\<app_sandbox_primary_path>\A.txt

Given the redirection, the corresponding file "A.txt" will be created at the location "c: \<app_sandbox_primary_path>." In an embodiment, the location "c:\<app_sandbox_primary_path>" is in the kernel-space and the location requires admin rights to create, access, modify, and/or delete the file.

As illustrated in FIGS. 9 and 10, the redirection of API calls is controlled by redirection rules that are implemented by the virtualization layer logic of the corresponding virtualization layers. Thus, through setting the redirection rules, a form of selective virtualization can be implemented when more than one virtualization layer is executing simultaneously on a client device. In both of the scenarios illustrated in FIGS. 9 and 10, the resulting virtualized API call is referred to as a compound virtualized API call because the API call has been virtualized by two separate and distinct virtualization layers. The compound virtualized API call is then passed to the operating system, e.g., kernel-space services/drivers, for execution of the function or functions associated with the API call. A response related to execution of the function or functions associated with the API call may be passed back up through the primary virtualization layer and then through the complimentary virtualization layer.

Figure 11:
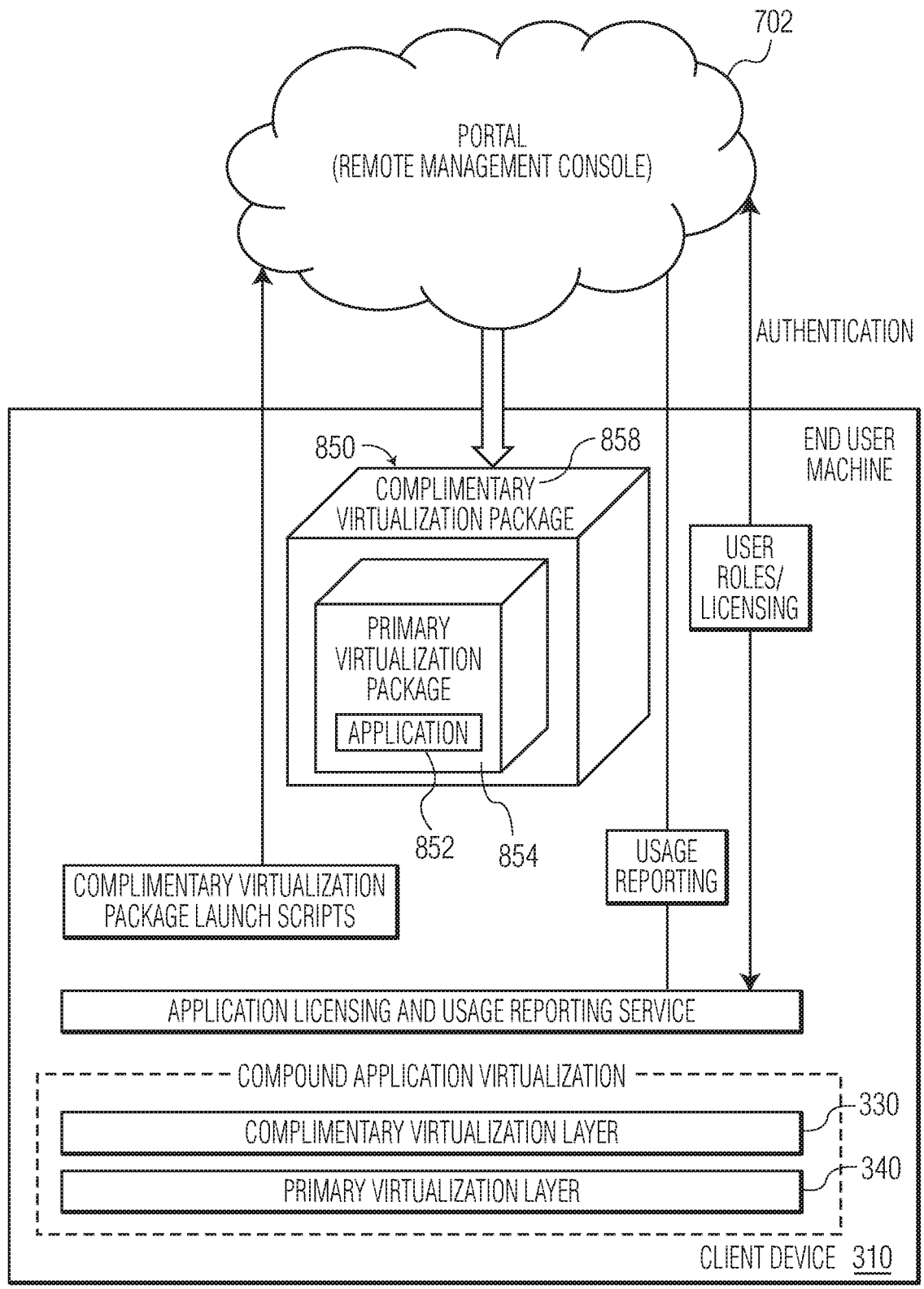
FIG. 11 illustrates an embodiment of a deployment of compound application virtualization.

As described above, compound virtualization can be applied to an application to utilize features of both the primary virtualization layer 330 and the complimentary virtualization layer 340. FIG. 11 illustrates an embodiment of a deployment of compound application virtualization. In the embodiment of FIG. 11, a compound virtualized application has been deployed at the client device 310, e.g., by downloading a compound application virtualization package from the virtualized application portal 702. In an embodiment, the portal manager can be used to manage license usage, for example, of a particular customer. In an embodiment, a customer has obtained a limited number of licenses for products and the use of the licensed products is tracked and controlled so that the limited number of licenses is not exceeded. In still another embodiment, the use of licensed products is tracked and fees are paid on a per-usage basis, e.g., usage reporting. In still another embodiment, the customer may have access to an unlimited number of licenses, but license use is still tracked. For example, a graphical user interface displays columns for "Total licenses," "Available Licenses," "License Type," "Available to Assign," and "Licenses in use."

In an embodiment, the virtualized application portal 702 can provide application monitoring features. For example, usage can be monitored on a per-application basis, a per-customer basis, a per-user basis, and/or a per-client device basis. Usage information can be provided in various formats and in various graphical user interfaces. Usage information can be helpful in many aspects of application management. Although an example of reporting is described above, reporting of different application usage and/or licensing information and reporting of other information related to the virtualized applications can be generated, managed, and/or reported via the virtualized application portal.

In an embodiment, the complimentary virtualization layer 330 has user-mode application virtualization layer logic, which allows the deployed application to be run without being natively installed on the client device. In such an embodiment, an end user does not need any local administrator rights and can be fully locked down using group policy. For example, nothing is written to the system in any of the protected areas so all that is required is the basic permissions to write to the C:\ProgramData\Sandbox folder (or C:\Documents and Settings\All Users\ApplicationData\Sandbox on WINDOWS XP) and the HKEY_Current_User\Software\Sandbox registry key which all users have by default.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for running an application via an operating system executing on a computing device, the method comprising:
    subjecting an API call to a complimentary application virtualization layer;
    after the API call is subjected to the complimentary application virtualization layer, subjecting the API call to a primary application virtualization layer; and
    after the API call has been subjected to the complimentary application virtualization layer and to the primary application virtualization layer, forwarding the API call to the operating system for processing in the kernel-space.

2. The method of claim 1, wherein subjecting an API call to a complimentary application virtualization layer comprises parsing the opcode of the API call and over-writing a jump instruction in a parsed portion of the opcode.

3. The method of claim 2, wherein subjecting an API call to a complimentary application virtualization layer comprises scanning for the length of initial opcodes and removing the initial bytes of an opcode sufficient to insert a desired jump instruction to the function with the redirection to the sandbox of the complimentary virtualization layer.

4. The method of claim 2, wherein subjecting an API call to a complimentary virtualization layer comprises following the jump destination and replacing the jump destination to point to the function with the redirection to the sandbox of the complimentary virtualization layer.

5. A method for running an application via an operating system executing on a computing device, the method comprising:
    virtualizing an API call from the application at a complimentary application virtualization layer to generate a virtualized API call;
    virtualizing the virtualized API call at a primary application virtualization layer to generate a compound virtualized API call; and
    forwarding the compound virtualized API call to the operating system for processing in the kernel-space.

6. A method for running an application via an operating system executing on a computing device, the method comprising:
    intercepting an API call at a complimentary application virtualization layer to generate a virtualized API call;

virtualizing the virtualized API call according to a primary application virtualization layer to generate a compound virtualized API call; and forwarding the compound virtualized API call to the operating system for processing in the kernel-space.

7. A system for running an application via an operating system executing on a computing device, the system comprising:

at least one processing unit and memory;

an operating system stored on the memory;

a complimentary application virtualization layer stored on the memory; and a primary application virtualization layer stored on the memory, wherein execution of an application on the operating system involves;

subjecting an API call from the application to the complimentary application virtualization layer;

after the API call is subjected to the complimentary application virtualization layer, subjecting the API call to a primary application virtualization layer; and after the API call has been subjected to the complimentary application virtualization layer and to the primary application virtualization layer, forwarding the API call to the operating system for processing in the kernel-space.

8. A non-transitory computer readable medium that stores computer-executable code that, when executed by a processor, performs steps to implement:

a compound virtualization package, the compound virtualization package including;

an application incorporated into a primary virtualization package and the primary virtualization package incorporated into a complimentary virtualization package, wherein the complimentary virtualization package and the primary virtualization package include layer-specific virtualization logic files, virtual files stores, and virtual configurations;

wherein execution of the compound virtualization package involves;

subjecting an API call to a complimentary application virtualization layer implemented from the complimentary virtualization package;

after the API call is subjected to the complimentary application virtualization layer, subjecting the API call to a primary application virtualization layer implemented from the primary virtualization package; and after the API call has been subjected to the complimentary application virtualization layer and to the primary application virtualization layer, forwarding the API call to an operating system for processing in the kernel-space.

* * * * *